US006341275B1

(12) United States Patent
Shi et al.

(10) Patent No.: US 6,341,275 B1
(45) Date of Patent: Jan. 22, 2002

(54) PROGRAMMABLE AND EXPANDABLE HAMMING NEURAL NETWORK CIRCUIT

(75) Inventors: Bingxue Shi; Gu Lin, both of Beijing (CN)

(73) Assignee: Winbond Electrnics Corp. (TW)

(*) Notice: Subject to any disclaimer, the term of this patent is extended or adjusted under 35 U.S.C. 154(b) by 0 days.

(21) Appl. No.: 09/300,117

(22) Filed: Apr. 27, 1999

(51) Int. Cl.$^7$ ............................................. G06F 15/18
(52) U.S. Cl. ........................... 706/33; 706/20; 706/38
(58) Field of Search ........................... 706/20, 33, 38, 706/1

(56) References Cited

U.S. PATENT DOCUMENTS

| | | | | | |
|---|---|---|---|---|---|
| 4,999,525 | A | * | 3/1991 | Park et al. ...................... | 706/33 |
| 5,050,095 | A | * | 9/1991 | Samad .......................... | 706/25 |
| 5,216,750 | A | * | 6/1993 | Smith ........................... | 706/18 |
| 5,406,508 | A | * | 4/1995 | Hayashibara ................. | 706/41 |
| 5,517,597 | A | * | 5/1996 | Aparicio, IV et al. ........ | 706/26 |
| 5,537,512 | A | * | 7/1996 | Hsia et al. ..................... | 706/33 |
| 5,630,021 | A | * | 5/1997 | Li et al. ......................... | 706/38 |
| 5,720,004 | A | * | 2/1998 | Li et al. ......................... | 706/33 |
| 5,999,643 | A | * | 12/1999 | Shi et al. ....................... | 706/31 |
| 6,185,331 | B1 | * | 2/2001 | Shi et al. ....................... | 706/1 |
| 6,205,438 | B1 | * | 3/2001 | Shi et al. ....................... | 706/5 |
| 6,272,476 | B1 | * | 8/2001 | Shi et al. ....................... | 706/1 |

OTHER PUBLICATIONS

Lan et al.; "Analog CMOS Current–Mode Implementation of the Feedforward Neural Network with On–Chip Learning and Storage". Proceedings of the IEEE International Conference on Neural Networks, Nov. 1995, vol. 1, p. 645–650.*

Carlos et al.; "An Extended Hamming Neural Network for Non Binary Pattern Recognition". Proceeding of the 37$^{th}$ Midwest Symposium on Circuits and Systems, Aug. 1994, vol. 1, p. 607–609.*

(List continued on next page.)

Primary Examiner—George B. Davis
Assistant Examiner—Kelvin Booker
(74) Attorney, Agent, or Firm—Gardere Wynne Sewell LLP; Sanford E. Warren, Jr.

(57) ABSTRACT

A Hamming neural network circuit which can be programmed and expanded is disclosed. The Hamming neural network includes an I/O circuit for inputting and outputting a plurality of standard patterns. A bi-directional transmission gate array is connected to the I/O circuit and controlled by a programming signal for transmitting the standard patterns. A plurality of standard pattern memory units is connected to the bi-directional transmission gate array for storing the plurality of standard patterns respectively. An address decoder is connected to the plurality of standard pattern memory units for addressing one of the plurality of standard pattern memory units. A plurality of pattern matching calculation circuit units are respectively connected to the plurality of standard pattern memory units for generating a plurality of matching rates between a to-be-recognized pattern and the plurality of standard patterns. An expandable matching rate comparing circuit is provided for comparing and sorting said plurality of matching rates.

10 Claims, 5 Drawing Sheets

OTHER PUBLICATIONS

Lu et al.; "A Modiefied Hamming Neural Network". 1995 4th International Conference on Solid–State and Integrated Circuit Technology, Oct. 1995, p. 694–696.*

Nino–de–Rivera et al.; "VLSI Implementation of an Extended Hamming Neural Network for Non Binary Pattern Recognition". Proceedings of the 38th Midwest Symposium on Circuits and Systems, Aug. 1995, vol. 2, p. 973–977.*

Huang et al.; "Neural Implementation of Fuzzy K–NN Classification for Seismic Pattern Recognition". IEEE International Conference on Neural Networks, Jun. 1996, vol. 3, p. 1588–1593.*

Guoxing et al.; "A Modified Current Mode Hamming Neural Network for Totally Unconstrained Handwritten Numeral Recognition". The 1998 International Joint Conference on Neural networks, May 1998, vol. 3, p. 1857–1860.*

Schmid et al.; "Hardware Realization of a Hamming Neural Network with On–Chip Learning". Proceeding of the IEEE International Symposium on Circuits and Systems, May 1998, vol. 3, p. 191–194.*

* cited by examiner

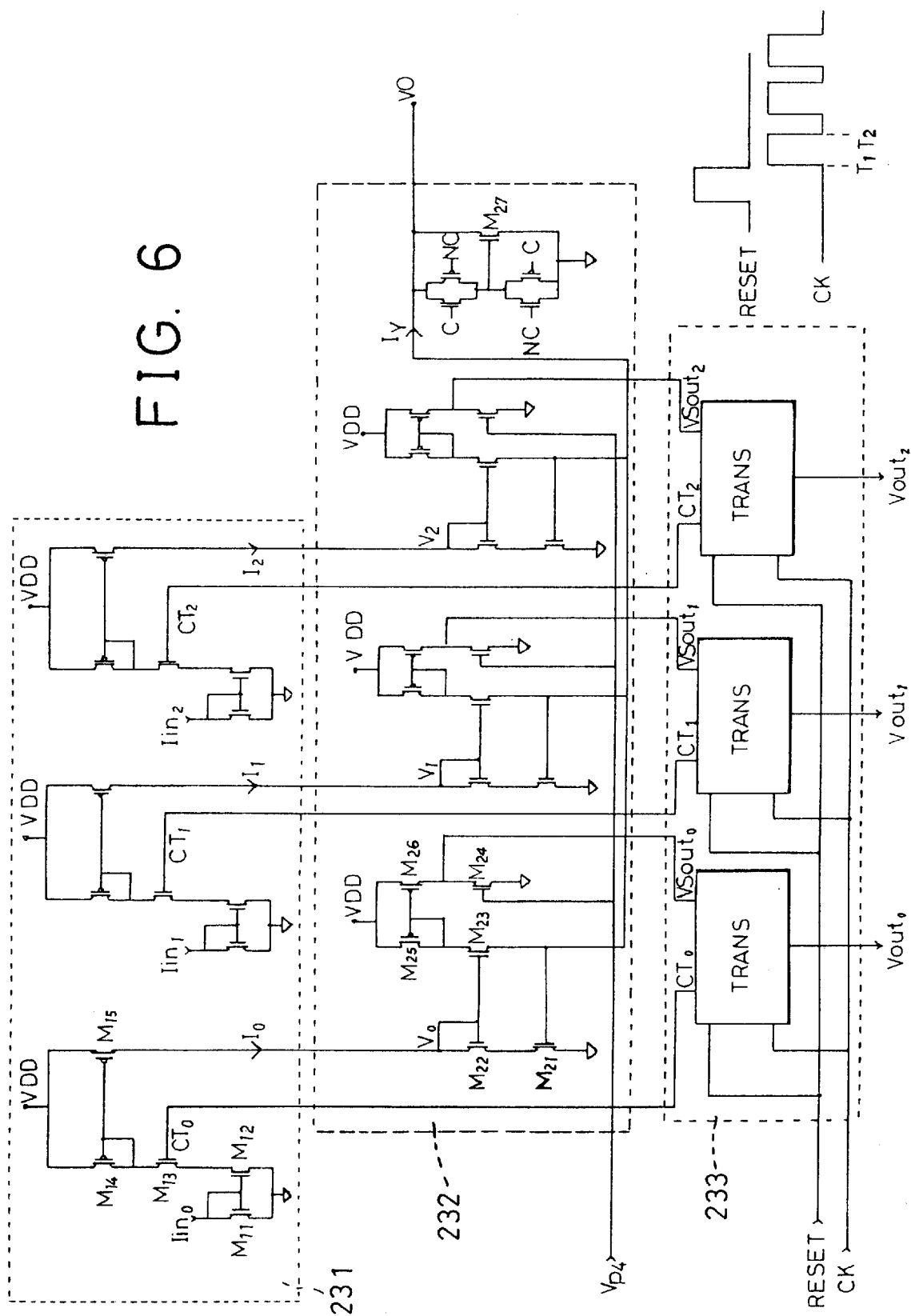

PROGRAMMABLE AND EXPANDABLE HAMMING NEURAL NETWORK CIRCUIT

BACKGROUND OF THE INVENTION

1. Field of the Invention

The present invention relates to a Hamming neural network circuit, more particularly, to a programmable and expandable Hamming neural network circuit.

2. Description of Related Art

Currently, an artificial neural network has become a fashionable and popular research topic. The neural network theory is thought to be the technique with the highest potential for solving many artificial intelligence problems. However, because a software neural network cannot satisfy many applications requiring parallel and real-time processing, the design of a very large integrated circuit (VLSI) neural network has become an important research objective.

Referring to FIG. 1, a typical Hamming neural network with a two-layer structure is shown. In a pattern recognition application, the first layer is used to find the matching rates between a to-be-recognized pattern and N standard patterns wherein the boxes on top of the layer are input pixels (11). There are N neurons (12) in the first layer, and each stores a standard pattern. The second layer is a winner-take-all (WTA) network (13) having N inputs and N outputs respectively corresponding to the N inputs. The WTA network (13) is used to find a standard pattern having the maximum matching rate and present a "1" on the corresponding output while the other outputs are "0"s. Although this typical Hamming neural network is easily constructed, it can only find the standard pattern which is the best match with the to-be-recognized pattern. However, with the rise in system complexity, the increase in the number of standard patterns and especially the development of expanded systems with multiple stages, the above Hamming neural network appears to be unsatisfactory. To enhance system performance, it is necessary to find two or more of the best matched standard patterns for the to-be-recognized pattern. Therefore, a novel Hamming neural network is set forth hereinafter, in which the standard patterns can be output sequentially according the degree to which they match the to-be-recognized pattern. Accordingly, m of the most matched standard patterns can be found sequentially where $1 \leq m \leq N$. This will greatly improve the system performance by increasing the recognition rate and reprocessing and reusing data in a multi-stage expanded system.

SUMMARY OF THE INVENTION

One object of the present invention is to provide a Hamming neural network circuit which can be programmed to satisfy the requirements in different applications.

Another object of the present invention is to provide a Hamming neural network circuit which can be expanded to enhance its adaptability in various applications.

In accordance with one aspect of the present invention, the Hamming neural network circuit comprises an I/O circuit for inputting and outputting a plurality of standard patterns, a bi-directional transmission gate array connected to the I/O circuit and controlled by a programming signal for transmitting the standard patterns, a plurality of standard pattern memory units connected to the bi-directional transmission gate array for storing the plurality of standard patterns, an address decoder connected to the plurality of standard pattern memory units for addressing one of the plurality of standard pattern memory units, a plurality of pattern matching calculation circuit units respectively connected to the plurality of standard pattern memory units for generating a plurality of matching rates between a to-be-recognized pattern and the plurality of standard patterns, and an expandable matching rate comparing circuit for comparing and sorting the plurality of matching rates.

Other objects, advantages, and novel features of the invention will become more apparent from the following detailed description when taken in conjunction with the accompanying drawings.

BRIEF DESCRIPTION OF THE DRAWINGS

FIG. 6 shows a circuit diagram of an expandable matching rate comparing circuit of the Hamming neural network circuit in accordance with the present invention and a timing diagram for controlling the expandable matching rate comparing circuit;

DETAILED DESCRIPTION OF PREFERRED EMBODIMENT

Figure 1:
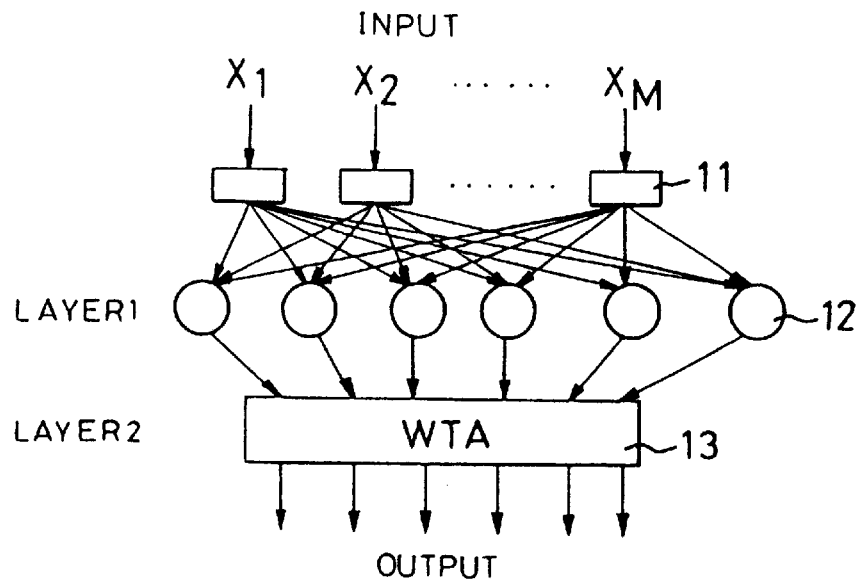
FIG. 1 is a schematic illustration of a typical Hamming neural network.
Figure 2:
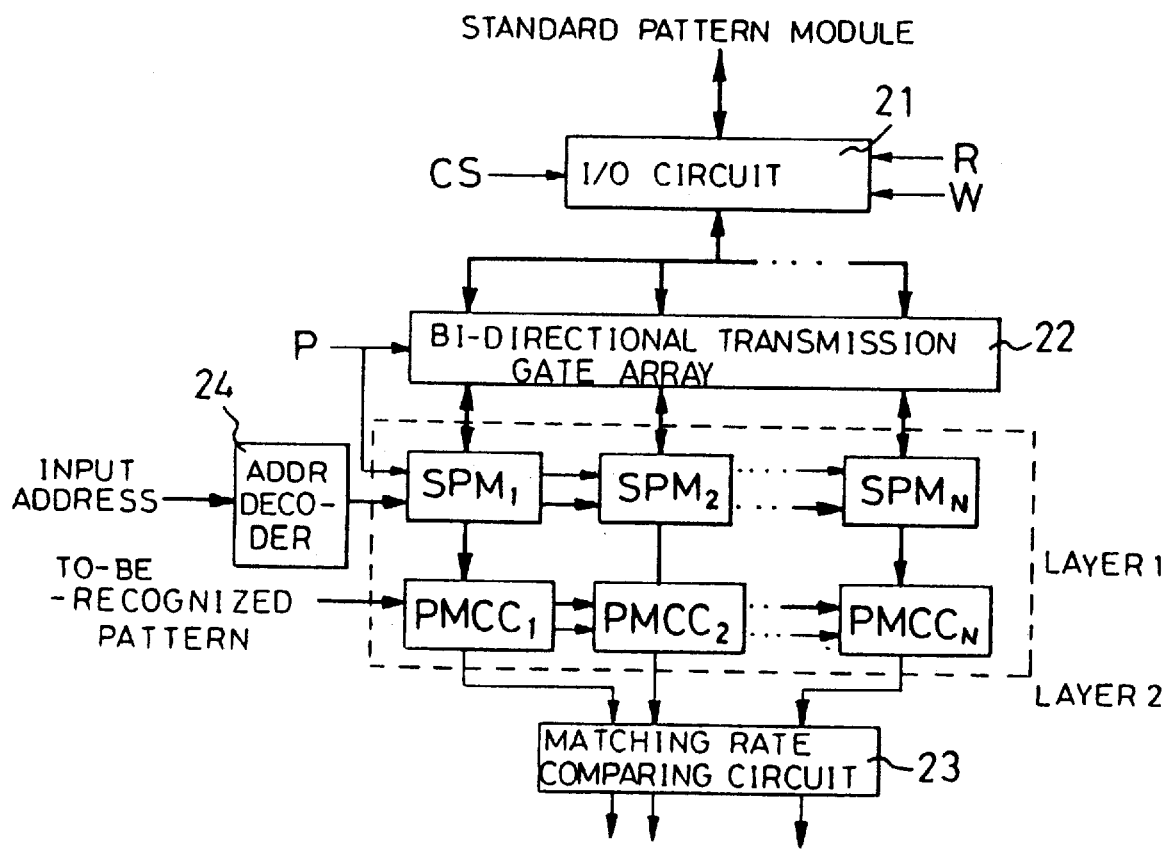
FIG. 2 is a block diagram of a Hamming neural network circuit in accordance With the present invention.

FIG. 2 illustrates, in block diagram form, a generalized programmable and expandable Hamming neural network circuit in accordance with the present invention, which is of a two-layer structure. The first layer includes storage and matching rate computation circuits to store N standard patterns and calculate the matching rates between the to-be-recognized pattern and the N standard patterns. In FIG. 2, SPM stands for "standard pattern memory", where $SPM_i$ ($1 \leq i \leq N$) stores the ith standard pattern. PMCC stands for "pattern matching calculation circuit", where $PMCC_i$ ($1 \leq i \leq N$) is used to calculate the matching rate between the to-be-recognized pattern and the ith standard pattern. The second layer has a matching rate comparing circuit (23) to compare and sort the matching rates from the first layer. The circuit sorts N matching rates in order of magnitude and outputs them as a recognition result.

The I/O (Input and Output) Circuit (21) in FIG. 2 is used for the Hamming neural network circuit to exchange data with a standard pattern module. R and W are read and write signals to the I/O circuit (21) for reading and writing the standard patterns. CS is a chip select signal to activate the I/O circuit (21). When CS is active, the I/O circuit (21 ) is enabled for data input and output; and while CS is inactive the I/O circuit (21) is disabled. In order to minimize the number of pins on the chip that implements the Hamming neural network circuit and to share the I/O circuit (21), standard patterns are input for programming in a serial manner. That is, N standard patterns are written into corresponding SPMs of the Hamming neural network circuit in a time-shared way. However, the neural network operates in a parallel manner to recognize a pattern. That is, the N standard patterns are concurrently compared with a to-be-recognized pattern. Therefore, a bi-directional transmission gate array (22) controlled by a programming signal P, is provided to facilitate the data input and output between the SPMs and the I/O circuit (21). When programming, P is set to high and the transmission gate array (22) is open. Each SPM unit exchanges data with the standard pattern module through the I/O circuit (21) in a time-shared manner under the control of an address decoder (24). To recognize a pattern, P is set to low and the transmission gate array (22) is closed. SPMs are isolated from the I/O circuit (21) and concurrently output data to PMCCs. The detailed pattern programming and recognition operations will be described hereinafter.

The I/O circuit (21), transmission gate array (22) and address decoder (24) can be implemented by well known digital circuits and therefore will not be described.

Figure 3:
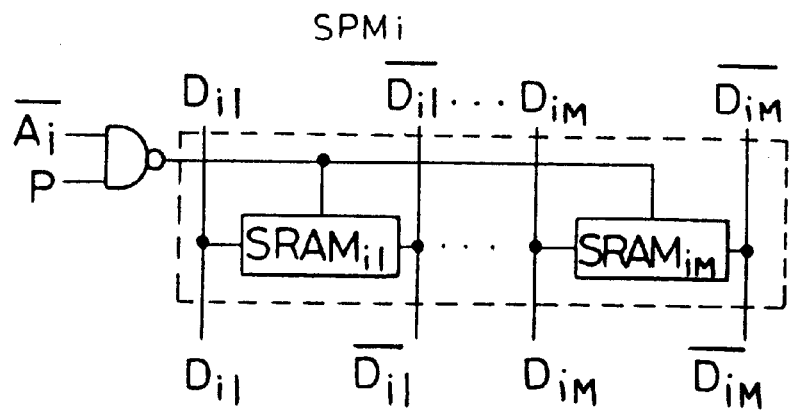
FIG. 3 is a circuit diagram of a standard pattern memory unit of the Hamming neural network circuit in accordance with the present invention.
Figure 4:
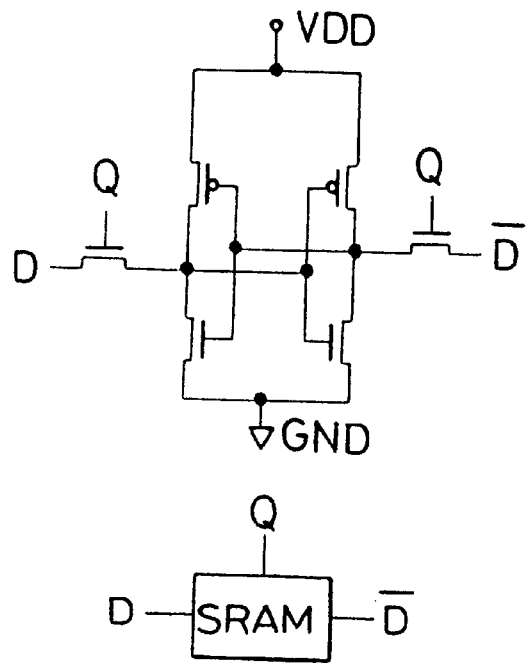
FIG. 4 is a circuit diagram of a SRAM unit having six terminals.

The circuit of the standard pattern memory is shown in FIG. 3 where $SPM_i$ ($1 \leq i \leq N$) is a standard pattern memory unit which stores the ith standard pattern. A SPM is constituted by a plurality of six-terminal SRAMs (Static Random Access Memory) as shown in FIG. 4. Referring to FIG. 3 again, the $SRAM_{ij}$ ($1 \leq i \leq N$, $1 \leq j \leq M$) stores the feature value of the jth pixel of the ith standard pattern and the $D_{ij}$ ($1 \leq i \leq N$, $1 \leq j \leq M$) is the data transmission line for $SRAM_{ij}$. The selection of a SRAM is controlled by the combination of the output $A_i$($1 \leq i \leq N$) of the address decoder (24) and the programming control signal P.

Referring to FIG. 2 again, when the Hamming neural network circuit is programming, CS is set to an active level to enable the I/O circuit (21) and P is set to a high level to open the transmission gate array (22). At that time, the standard patterns are sequentially written into the respective SPM under the control of write signal W and address signal $A_i$. On the other hand, the data in a SPM can be read out to verify the correctness of the written data under the control of the read signal R and the address signal $A_i$. To recognize a pattern, CS is set to an inactive level to disable the I/O circuit (21) and P is set to low to close the transmission gate array (22). All SPMs simultaneously output data to PMCCs for pattern matching calculation.

Figure 5:
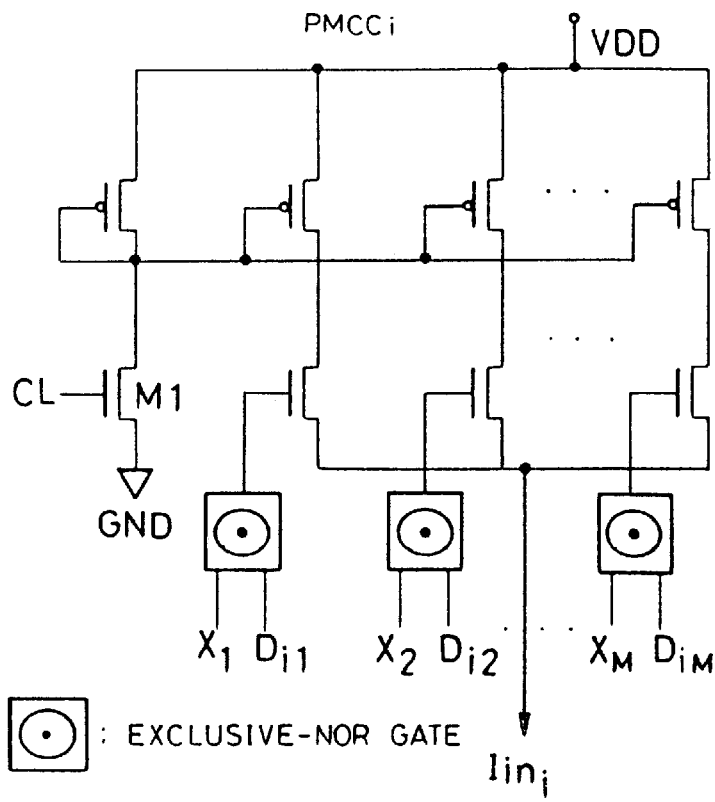
FIG. 5 is a circuit diagram of a pattern matching calculation circuit of the Hamming neural network circuit in accordance with the present invention.

The detailed circuit diagram of the pattern matching calculation circuit is shown in FIG. 5, where $PMCC_i$ ($1 \leq i \leq N$) is a pattern matching calculation circuit unit to calculate the matching rate between the ith standard pattern and the to-be-identified pattern $X(X_1, X_2, \ldots, X_M)$. Each PMCC is constituted by an equal-ratio current mirror connected with a plurality of Exclusive-NOR gates. The CL in FIG. 5 provides an offset voltage to the NMOS transistor M1 arranged on an offset path. When the PMCC is operated, CL is set to high thereby the current mirror generates an offset current $I_{bias}$. When the PMCC is not required to operate (such as when the Hamming neural network circuit is programming), CL is set to low to minimize the power dissipation of the PMCC. In addition, $D_{i1} \sim D_{iM}$ are outputs of the SPM of the ith standard pattern. $X_1 \sim X_M$ are inputs of the to-be-recognized pattern. With the Exclusive-NOR operation (designated by $\odot$) of each pixel, the matching rates between the to-be-recognized pattern and the standard patterns are calculated. The output current $Iin_i$ ($1 \leq i \leq N$) is proportional to the matching rate between the to-be-recognized pattern and the ith standard pattern, which can be expressed by $Iin_i = (\Sigma_{j=1 \sim M} X_j \odot D_{ij}) \times I_{bias}$ where $I_{bias}$ is the offset current of NMOS transistor M1. As a result, the larger the $Iin_i$ is, the higher the matching, rate between the to-be-recognized pattern and the ith standard pattern is and the more the to-be-recognized pattern is close to the ith standard pattern. For convenience. $Iin_i$ is defined as the matching rate between the to-be-recognized pattern and the ith standard pattern.

The matching rate comparing circuit (23) compares and sorts the N matching rates $Iin_i$ ($1 \leq i \leq N$) to generate high level pulses sequentially on corresponding outputs in order of magnitude of the matching rate. Further concerning the chip expansion application in which H chips (each can recognize N standard patterns) are connected in parallel to recognize H×N standard patterns, the matching rate comparing circuit (23) has to compare and sort H×N matching rates. Thus the matching rate comparing circuit (23) must be expandable. Accordingly, the matching rate comparing circuit (23) is capable of sorting and expansion functions.

Figure 7:
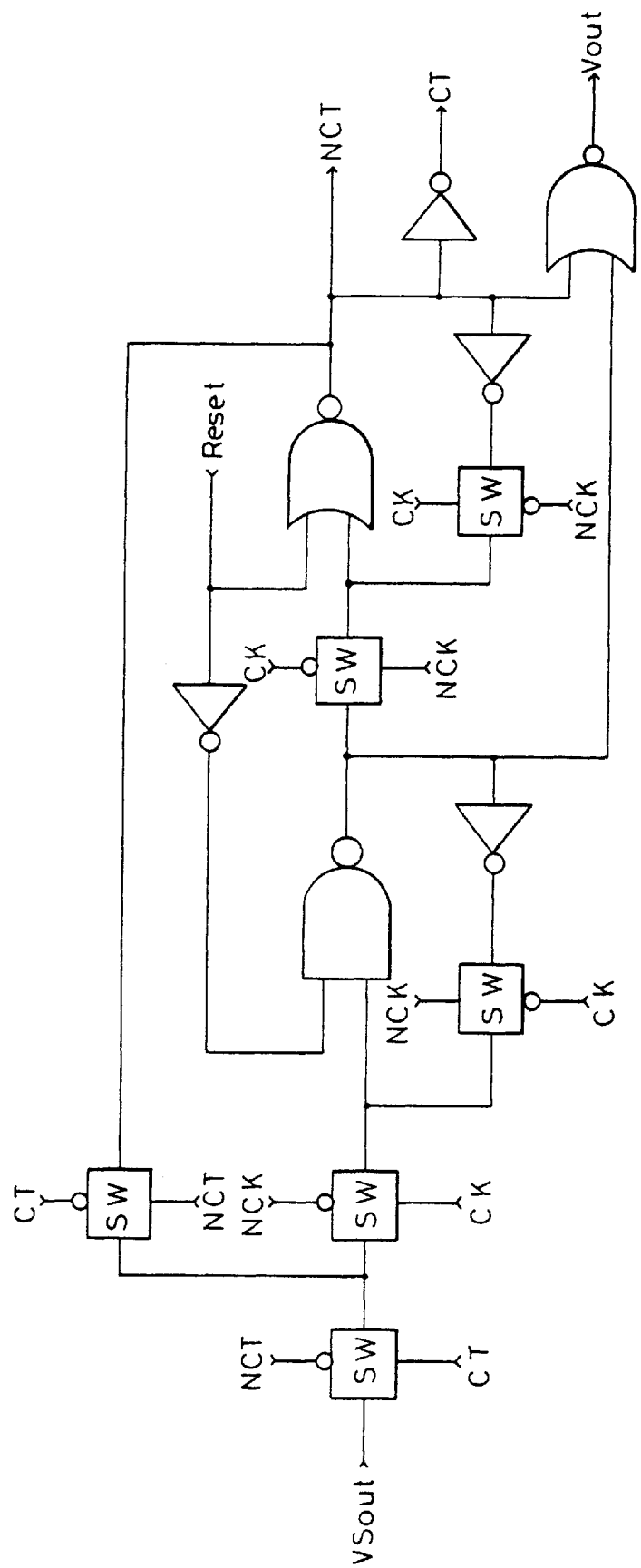
FIG. 7 is a circuit diagram of a transfer unit of the expandable matching rate comparing circuit.

For convenience, a matching rate comparing circuit (23) with three inputs is provided as an example. FIG. 6 shows the circuit and timing diagrams for the matching rate comparing circuit (23). The matching rate comparing circuit (23) includes an input circuit unit (231), a WTA (winner-take-all) circuit unit (232) and a feedback control and voltage output unit (232). The input circuit unit (231) comprises three identical input units where $Iin_i$ ($0 \leq i \leq 2$) designate three input currents representing three matching rates which are directed and output to the WTA circuit unit (232). The WTA circuit unit (232) receives the input currents from the input circuit unit (23 1) to find the maximum current among them and output three voltage signals $VSout_i$ ($0 \leq i \leq 2$) indicating the maximum one. The feedback control and voltage output circuit unit (233) comprises three identical transfer units (TRANS). The circuit diagram for each transfer unit is shown in FIG. 7 which generates feedback control signals $CT_i$ ($0 \leq i \leq 2$) according to $VSout_i$ ($0 \leq i \leq 2$) to control the output currents of the input circuit unit (231 )

The matching rate comparing circuit (23) is provided with a single operational mode and an expanded operational mode. In the single operational mode, a circuit chip having N inputs is operated independently to compare and sort N currents. In the expanded operational mode, H circuit chips, each having N inputs, are connected in parallel to compare and sort H×N currents. The operations of the circuit chip are described below.

Referring to FIG. 6 again, in the single operational mode, the VO terminal is floating and the control terminal C is set to high which cause the gate and drain of the MOS transistor $M_{27}$ short-connected whereby the transistor $M_{27}$ works in the saturation region. With reference to the timing diagram in FIG. 6, the high of the signal RESET causes the $Vout_i$ ($0 \leq i \leq 2$) in the feedback control and voltage unit (233) to be low and $CT_i$ ($0 \leq i \leq 2$) to be high, which results in $I_i$ ($0 \leq i \leq 2$)=$Iin_i$ ($0 \leq i \leq 2$) in the input circuit unit (231). Furthermore, when CT is high, the feedback control and voltage unit (233) are able to sample the outputs of the WTA circuit unit (232). The WTA circuit unit (232) is a fully symmetrical three-input WTA circuit in which the dimensions of all the NMOS transistors corresponding to transistors $M_{21}$, $M_{22}$ and $M_{23}$ are identical. The width to length ratio (W/L) of $M_{27}$ is the same as that of $M_{21}$. When the WTA circuit unit (232) is in operation, voltages $V_0$, $V_1$ and $V_2$ are established respectively by the input current $I_0$, $I_1$ and $I_2$. For convenience, assuming $I_0 = \max(I_0, I_1, I_2)$, we have $V_0 = \max(V_0, V_1, V_2)$. Transistor $M_{23}$ and corresponding NMOS transistor constitute a differential circuit, and voltages $V_0$, $V_1$ and $V_2$ are input voltages to the differential circuit. When $|V_0 - V_i| > (2I_y/\beta)^{1/2}$ for i=1,2 is satisfied, where, $\beta=[\mu C_{ox}/2](W/L)$ and W/L is the width to length ratio of $M_{27}$, $I_y$ flows through a differential transistor having the maximum input voltage. That is, the drain current of $M_{23}$ is $I_y$ and the drain currents of the other corresponding differential transistors are zero. Therefore, VSout$_0$ is high and VSout$_1$ and VSout$_2$ are low so that the maximum-finding operation is completed. At T1, clock signal CK becomes high. In the feedback control and voltage output unit (233), the high VSout$_0$ causes Vout$_0$ to be high while Vout$_1$ and Vout$_2$ remain low due to the low voltage levels of VSout$_1$ and VSout$_2$. At T2, clock signal CK becomes low. In the feedback control and voltage output unit (233), the low CK causes Vout$_0$ and CT$_0$ to be low while Vout$_1$ and Vout$_2$ remain low and CT$_1$ and CT$_2$ remain high. Thus, a high voltage pulse is generated on the Vout$_0$ terminal. On the other hand, the low CT$_0$ isolates a portion of the feedback control and voltage output unit (233) corresponding to Iin$_0$ from the WTA circuit unit (232) whereby Vout$_0$ and CT$_0$ always remain low until the next RESET signal is inserted. In the input circuit unit (231), the low CT$_0$ turns $M_{13}$ off resulting in $I_0$ being zero, whereby $I_0$ will not influence the sequential operations. Similarly, the second maximum current is determined by the process described above, and a high voltage pulse is also generated on the corresponding Vout terminal. In this manner, all of the input currents are sorted in order of magnitude under the control of the clock signals. Meanwhile, high voltage pulses are sequentially generated on the corresponding Vout terminals as a recognition result.

In the expanded mode, it is able to sort H×N currents by connecting H circuit chips, each having a matching rate comparing circuit (23) with N current inputs. In this mode, the RESET terminals, the CK terminals and the VO terminals of the H chips are connected together respectively. Meanwhile, one of the control terminals C is set to high and the others are set to low. For convenience, taking N=3 and H=2 for example, the control terminal $C_1$ of circuit chip 1 is set to high and the control signal $C_2$ of circuit chip 2 is set to low. Referring to FIG. 6 again, the gate voltage of the NMOS transistor $M_{27}$ in circuit chip 2 is low. That is, $M_{27}$ of circuit chip 2 does not have any effect on sorting operations. Thus, one $M_{27}$ is shared by two circuit chips. Obviously, the two independent three-input matching rate comparing circuits (23) have been merged to one expanded six-input matching rate comparing circuit (23). The operation of this six-input matching rate comparing circuit (23) is the same as that of the three-input matching rate comparing circuit (23) described above. Shalt is, the expanded matching rate comparing circuit (23) sequentially outputs corresponding high voltage pulses on Vout$_i$ ($0 \leq i \leq 5$) according to the magnitudes of the input currents Iin$_i$ ($0 \leq i \leq 5$).

After the previous description, it is clear that the Hamming neural network is able to determine and output the standard patterns in order of the magnitude of the matching rate. Because the matching rate comparing circuit (23) is operated under timing signals, it is possible to select m of the most closely matched standard patterns by setting the number of pulses in clock CK to be m ($1 \leq m \leq N$). For example, if m=1, the Hamming neural network circuit of the present invention is simplified to be the one described in the related art; if m=N, the Hamming neural network circuit outputs all the standard patterns in an order of magnitude of the matching rate.

Figure 8:
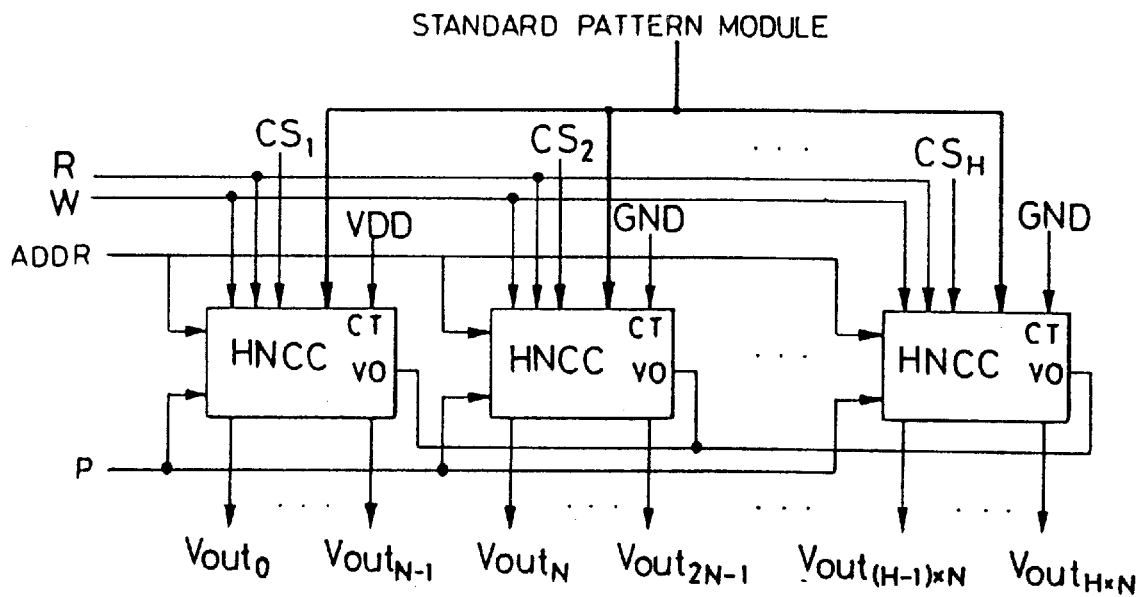
FIG. 8 shows that H Hamming neural network circuit chips are connected in parallel for expansion.

Because the matching rate comparing circuit (23) is expandable, the Hamming neural network circuit is easily applied to expanded applications thereby increasing the performance of the neural network. FIG. 8 shows H Hamming network circuit chips (HNCC) connected in parallel wherein each HNCC can recognize N standard patterns. When programming, the HNCCs are operated in a timed-shared way. That is, $CS_h$ ($1 \leq h \leq H$) are sequentially enabled to write the H×N standard patterns into the respective HNCC, each HNCC being written with N standard patterns. For pattern recognition, the H HNCCs are operated concurrently; that is, the calculations for matching rates between the to-be-recognized pattern and the H×N standard patterns are processed simultaneously. Then, the calculated H×N matching rates are sorted and output as a recognition result.

As the matching rate comparing circuit (23) is the kernel of the Hamming neural network circuit in accordance with the present invention, a test is made of a matching rate comparing circuit (23) with three inputs to evaluate its performance. The matching rate comparing circuit (23) for test is fabricated using 2 μm N-well standard digital CMOS technology with a single metal layer and a single polysilicon layer. Table 1 gives the test results indicating the main characteristics of the matching rate comparing circuit (23). The test shows that the matching rate comparing circuit (23) is functionally correct and has excellent performance thereby satisfying the requirement of the Hamming neural network.

TABLE 1

| | |
|---|---|
| operating frequency | more than 5 MHz |
| standard operating voltage | +5 V |
| average sorting discriminating rate | about 5 μA |
| highest sorting discriminating rate | 2 μA |
| average sorting precision degree | about 10 μA |
| range of input current | 15 μA~280 μA | although the present invention has been explained in relation to its preferred embodiment, it is to be understood that many other possible modifications and variations can be made without departing from the spirit and scope of the invention as hereinafter claimed.

What is claimed is:

1. A Hamming neural network circuit for finding the matching rates between a to-be-recognized pattern and a plurality of standard patterns, comprising:

an I/O circuit enabled by a chip select signal for inputting and outputting said plurality of standard patterns;

a bi-directional transmission ate array connected to said I/O circuit and controlled by a programming signal;

a plurality of standard pattern memory units for storing said plurality of standard patterns respectively, each connected to said bi-directional transmission gate array;

an address decoder connected to said plurality of standard pattern memory units for addressing said plurality of standard pattern memory units;

a plurality of pattern matching calculation circuit units respectively connected to said plurality of standard pattern memory units, each receiving said to-be-recognized patterns, and generating a plurality of matching rates between said to-be-recognized pattern and said plurality of standard patterns; and an expandable matching rate comparing circuit having a plurality of inputs respectively connected to said plurality of pattern matching calculation circuits and having a plurality of outputs respectively corresponding to said plurality of inputs for comparing and sorting said plurality of matching rates to sequentially present a plurality of high voltage pulses on said plurality of outputs in order of magnitude of the matching rate.

2. The Hamming neural network circuit as claimed in claim 1 wherein said bi-directional transmission gate array is open by setting said programming signal to a high voltage level to transmit said plurality of standard patterns to said plurality of standard pattern memory units respectively.

3. The Hamming neural network circuit as claimed in claim 2 wherein said address decoder sequentially generates a plurality of address signals to respectively select one of said plurality of standard pattern memory units to store a corresponding standard pattern.

4. The Hamming neural network circuit as claimed in claim 1 wherein each one of said plurality of standard pattern memory units includes a plurality of static random access memory units.

5. The Hamming neural network circuit as claimed in claim 1 wherein each one of said pattern matching calculation circuit units includes an equal-ratio current mirror connected with a plurality of Exclusive-NOR gates.

6. The Hamming neural network circuit as claimed in claim 1 wherein said expandable matching rate comparing circuit comprises:
   an input circuit unit having a plurality of current outputs for outputting a plurality of currents representing said plurality of matching rates received on said plurality of inputs;
   a winner-take-all (WTA) circuit unit receiving said plurality of currents from said input circuit for establishing a plurality of representing voltages corresponding thereto wherein the maximum one among said plurality of representing voltages generates a representing current controlled by a control terminal to be output on a VO terminal, and generating a plurality of first voltage output signals respectively corresponding to the received plurality of currents for indicating said maximum current; and
   a feedback control and voltage output unit having a clock terminal for receiving a clock signal, receiving said plurality of first voltage output signals from said winner-take-all circuit unit, generating a plurality of feedback control signals according to said plurality of first voltage output signals in one operation cycle controlled by said clock signal to control the outputs of said input circuit unit wherein one of said plurality of feedback control signals corresponding to the first voltage output signal indicative said maximum current is set inactive for guiding said input circuit unit to clear a corresponding input current, and converting said plurality of first voltage output signals to a plurality of second voltage output signals on said plurality of outputs in said operation cycle; a reset terminal being provided for receiving reset signals to reset said feedback control and voltage output unit.

7. A Hamming neural network circuit for finding the matching rates between a to-be-recognized pattern and a plurality of standard patterns, comprising:
   an I/O circuit enabled by a chip select signal for inputting and outputting said plurality of standard patterns;
   a bi-directional transmission gate array connected to said I/O circuit and controlled by a programming signal;
   a plurality of standard pattern memory units connected to said bi-directional transmission gate array for storing said plurality of standard patterns respectively, each having a plurality of static random access memory units;
   an address decoder connected to said plurality of standard pattern memory units for addressing said plurality of standard pattern memory units;
   a plurality of pattern matching calculation circuit units respectively connected to said plurality of standard pattern memory units, each having an equal-ratio current mirror connected with a plurality of Exclusive-NOR gates and receiving said to-be-recognized pattern, and generating a plurality of matching rates between said to-be-recognized pattern and said plurality of standard patterns; and
   an expandable matching rate comparing circuit including:
   an input circuit unit having a plurality of current inputs respectively connected to said plurality of pattern matching calculation circuits and a plurality of current outputs for outputting a plurality of currents representing said plurality of matching rates received on said plurality of current inputs;
   a winner-take-all (WTA) circuit unit receiving said plurality of currents from said input circuit for establishing a plurality of representing voltages corresponding thereto wherein the maximum one among said plurality of representing voltages generates a representing current controlled by a control terminal to be output on a VO terminal, and generating a plurality of first voltage output signals respectively corresponding to the received plurality of currents for indicating said maximum current; and
   a feedback control and voltage output unit having a clock terminal for receiving a clock signal and a plurality of outputs respectively corresponding to said plurality of current inputs of said input circuit unit, receiving said plurality of first voltage output signals from said winner-take-all circuit unit, generating a plurality of feedback control signals according to said plurality of first voltage output signals in one operation cycle controlled by said clock signal to control the outputs of said input circuit unit wherein one of said plurality of feedback control signals corresponding to the first voltage output signal indicative said maximum current is set inactive for guiding said input circuit unit to clear a corresponding input current, and converting said plurality of first voltage output signals to a plurality of second voltage output signals on said plurality of outputs in said operation cycle; and a reset terminal being provided for receiving reset signals to reset said feedback control and voltage output unit.

8. The Hamming neural network circuit as claimed in claim 7 wherein said bi-directional transmission gate array is open by setting said programming signal to a high voltage level to transmit said plurality of standard patterns to said plurality of standard pattern memory units respectively.

9. The Hamming neural network circuit as claimed in claim 7 wherein said address decoder sequentially generates a plurality of address signals to respectively select one of said plurality of standard pattern memory units to store a corresponding standard pattern.

10. An expanded Hamming neural network circuit comprising a plurality of Hamming neural network circuits as claimed in claim 7, wherein said reset terminals, said clock terminals and said VO terminals of said plurality of Hamming neural network circuits are connected together respectively and wherein one of said control terminals of said Hamming neural network circuits is set active and the others are set inactive.

* * * * *